(Model.)
J. S. SILVERA.
LONG RANGE AND CLOSE WEEDING GARDEN CULTIVATOR.
No. 248,357. Patented Oct. 18, 1881.
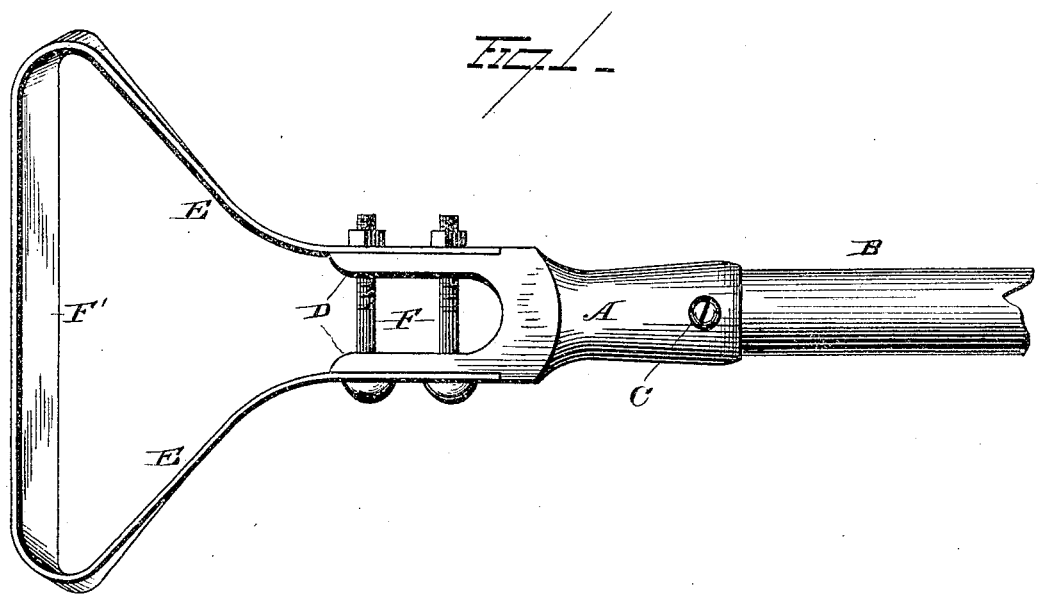
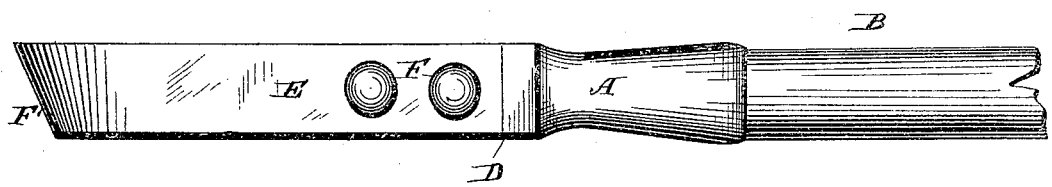
WITNESSES
Herman Moran.
INVENTOR
Joseph S. Silvera
ATTORNEY

UNITED STATES PATENT OFFICE.

JOSEPH S. SILVERA, OF CAMPTONVILLE, CALIFORNIA.

LONG-RANGE AND CLOSE WEEDING GARDEN-CULTIVATOR.

SPECIFICATION forming part of Letters Patent No. 248,357, dated October 18, 1881.

Application filed June 22, 1881. (Model.)

*To all whom it may concern:*

Be it known that I, JOSEPH S. SILVERA, of Camptonville, in the county of Yuba and State of California, have invented certain new and useful Improvements in Long-Range and Close Weeding Garden-Cultivators; and I do hereby declare the following to be a full, clear, and exact description of the invention, such as will enable others skilled in the art to which it pertains to make and use it, reference being had to the accompanying drawings, which form part of this specification.

My invention relates to an improvement in garden-cultivators, the object of the same being to furnish a cheap and simple device for turning over loose soil, but is more especially designed for clearing weeds or grass perfectly clean from around plants in the shortest possible time without injury to the same.

With these ends in view my invention consists in certain details in construction and combinations of parts, as will be more fully explained, and pointed out in the claim.

In the accompanying drawings, Figure 1 is a plan view, and Fig. 2 is a side view.

A is the socket, adapted at one end to receive the handle B, the latter being secured therein by the screw C. The socket is provided at its opposite end with arms D, onto which the blade E is secured. These arms D are situated at a suitable distance apart, and are provided with smooth flat outer faces, against which the extreme ends of the blade are secured by the bolts F, which pass completely through the blade and arms and hold them together by nuts. The upper portions of these arms are provided with shoulders, against which the ends of the blade E bear, which assist the bolts in holding the blade in position, and also enable one bolt to be dispensed with, if desired.

The blade E is made from a strip of thin steel plate having holes near its ends, which register with the holes in the arms D, by which they are secured to the socket, and it is also curved, as shown in the drawings, with the portion F' so inclined as not to present a surface at right angles to the socket, but when placed in the ground to present nearly a horizontal cutting-edge, which allows the cultivator to be operated with but a small expenditure of power.

By gradually curving the sides of the blade, as shown, I am enabled to go around plants and completely clear the ground around same of weeds without the least injury thereto by simply bringing the curved side of the blade against the stalk and pulling on the handle. As the handle is drawn toward the operator the curved side hugs the plant and causes the blade to pass around to one side of the plant, which completely clears that side of weeds. By repeating the operation on the opposite side the weeds are completely cleared from around the plant. For such vegetables as are planted in drills it is simply necessary to stand in the line of the drill and extend the cultivator as far as the handle will allow and draw same toward you, and repeat the operation on the opposite side. This cultivator is also useful to clear the water-gutters used in irrigating lands of weeds, which many times give serious trouble.

I am aware that hoes have been constructed of triangular and diamond shaped cutting-blade secured to a socket attached to the handle, and hence I would have it understood that I make no broad claim to such forms of cutting-blade.

Having fully described my invention, what I claim as new, and desire to secure by Letters Patent, is—

A garden-cultivator consisting in the combination, with the handle B, socket A, provided with prongs D D, having straight flat bearing-faces and shoulders on their outer sides, of the blade, curved as described, and having its ends secured to the outer faces of the prongs D D by bolts F F, extending transversely through the prongs, the ends of the blade abutting against the shoulders on the outer faces of the prongs, substantially as set forth.

In testimony that I claim the foregoing I have hereunto set my hand this 13th day of May, 1881.

JOSEPH S. SILVERA.

Witnesses:
JOHN R. MEEK,
E. T. JACKSON.